United States Patent [19]

Rath

[11] Patent Number: 4,700,816
[45] Date of Patent: Oct. 20, 1987

[54] DRUM BRAKE INCLUDING THREE BRAKE SHOES

[75] Inventor: Heinrich-Bernhard Rath, Vallendar, Fed. Rep. of Germany

[73] Assignee: Lucas Industries public limited company, Birmingham, England

[21] Appl. No.: 862,657

[22] Filed: May 13, 1986

[30] Foreign Application Priority Data

May 15, 1985 [DE] Fed. Rep. of Germany ... 8514496[U]

[51] Int. Cl.⁴ .............................................. F16D 51/34
[52] U.S. Cl. ................................ 188/323; 188/106 A
[58] Field of Search ............... 188/106 A, 106 F, 323, 188/326, 327, 331, 334, 342

[56] References Cited

U.S. PATENT DOCUMENTS

| 1,659,811 | 2/1928 | Dick | 188/323 X |
| 2,131,369 | 9/1938 | Brisson | 188/323 |
| 2,161,493 | 6/1939 | Wallace | 188/323 X |
| 2,966,238 | 12/1960 | Lauer et al. | 188/334 |

*Primary Examiner*—Duane A. Reger
*Attorney, Agent, or Firm*—Scrivener and Clarke

[57] ABSTRACT

In a drum brake including three brake shoes (4,22,23) adapted to be pressurized hydraulically and/or mechanically first and second hydraulically operable brake shoes (4,22) are supported trailingly in forward travelling direction (21), while the third brake shoe (23), together with at least one of the other brake shoes (4,22) is pressurized upon mechanical braking such that one each of the brake shoes (23 and 4 or 22) is supported trailingly and one is supported leadingly, both in forward and backward travelling directions.

4 Claims, 1 Drawing Figure

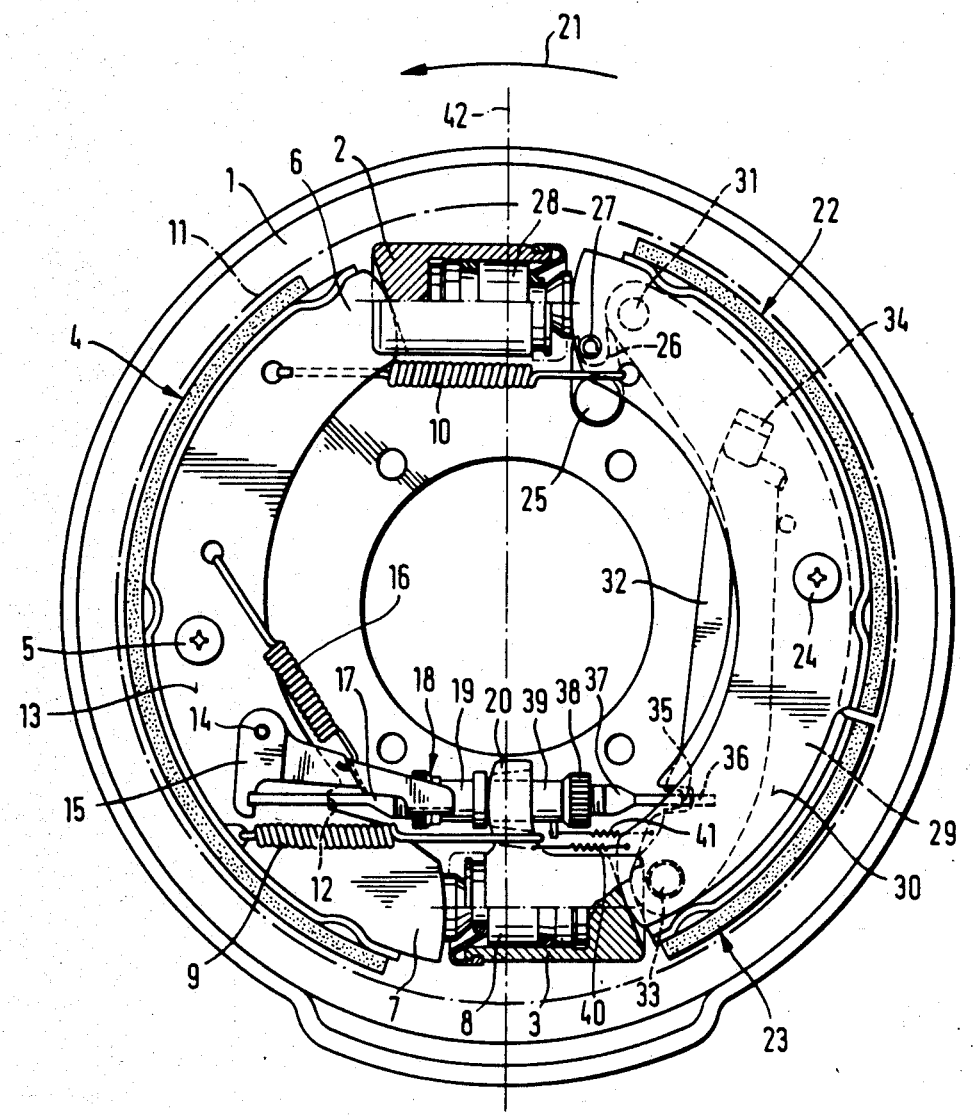

DRUM BRAKE INCLUDING THREE BRAKE SHOES

The invention relates to a drum brake including three brake shoes adapted to be pressurized hydraulically and/or mechanically.

U.S. Pat. No. 2,365,715 discloses a drum brake of that kind with which the three brake shoes each are operable hydraulically in parallel and independently of one another. The three brake shoes do not differ as to their leading and trailing properties.

The level of the frictional value between the tire and the road sets a limit to braking a vehicle. The best possible use of this given physical limit value under critical braking conditions is afforded if an hydraulic brake system is so designed that the brake pedal pressure and, if desired, the power assistance of the braking are translated in such manner that the brake pressure acting on the brake shoes will generate a brake torque which approaches the range of the adhesive limit between tire and road.

The instantaneous effective braking couple is a complicated function not only of the hydraulically produced brake load (if desired by an additional brake booster) but also depending on other parameters, such as the geometric dimensions of the frictional surfaces undergoing changes, among others, due to the development of heat upon braking, and the frictional value (coefficient of friction) existing between the brake shoes and the brake drum. The quotient of the effective peripheral force and of the brake pressure generated hydraulically or mechanically, in general, is referred to as factor "C*". The factor C* thus defined is a function of the coefficient of friction $\mu$ mentioned between the brake shoes and the drum. The gradient of this function $C^*(\mu)$ is called sensitivity $E_0$. Thus the following definition may be applied:

$$E_0 = \frac{dC}{d\mu}.$$

The sensitivity $E_0$ indicates the variation of the factor by the coefficient of friction $\mu$. If the characteristic value is a steeply rising function of the coefficient of friction $\mu$, the resulting sensitivity $E_0$ is great; the brake response is very "hard". The coefficient of friction $\mu$ itself is a function, among others, of the temperature of the frictional surfaces.

In a first approximation the factor is calculated as follows for symmetrical brake shoes:

$$C^* \text{ leading} = \frac{K_1 \times \mu}{K_2 - \mu}$$

$$C^* \text{ trailing} = \frac{K_1 \times \mu}{K_2 + \mu}$$

$K_1$ and $K_2$ are empirical values to be derived from the geometry of the brake shoes and to be considered approximately constant.

It follows from the above equations that the factor C* of a leading brake shoe arrangement is much greater than the factor C* of a trailing brake shoe arrangement.

A high factor C* is needed if a high brake torque is to be generated in drum brakes at low brake pressure. Of course, this requires that also the sensitivity $E_0$ be high. As the corresponding response behavior of the brake is hard, this high sensitivity is not very desirable.

Apart from hydraulic brake actuation, some mechanical actuation of the brake usually is provided as well, embodied by a device usually named handbrake or, more broadly referred to as or parking brake because, of course, it may be foot operated as well. For economic reasons such parking brakes normally are designed without any servo units. The muscular force applied by the driver is to be sufficient to initiate the required braking effect.

As a rule, therefore, minor variations of the factor (sensitivity) upon hydraulic braking are desirable, whereas, on the other hand, high sensitivity of the mechanical locking brake may be put up with because then it will be easy to reach a high factor C* providing a relatively high brake torque at a given maximum brake pressure.

It is an object of the invention to provide a drum brake of relatively low sensitivity upon hydraulic braking at least in the forward travelling direction, while a higher factor is reached upon mechanical braking. It is another object of the invention to provide a drum brake of the kind mentioned which is of simple structure and thus may be produced at reasonable cost.

These objects are met, in accordance with the invention, in that first and second hydraulically operable brake shoes are supported trailingly in the forward travelling direction, and that, upon mechanical braking, the third brake shoe is pressurized together with at least one of the other brake shoes such that one each of the brake shoes is supported trailingly and one is supported leadingly, both in forward and backward travelling directions.

When braking hydraulically, therefore, the driver will enjoy the rather limited sensitivity, a brake booster could perhaps be used. When applying the manually operated brake, on the other hand, the physical force is translated at high efficiency into a brake torque by virtue of the high sensitivity.

Advantageous modifications of the invention are defined in the subclaims.

The invention will be described further, by way of example, with reference to the accompanying drawing which shows a diagrammatic sectional elevation of an embodiment of a drum brake according to the invention.

Two single working wheel brake cylinders 2, 3 are secured to a backplate 1. A first brake shoe 4 shown at the left is pressed in per se known manner against the backplate 1 by a pin/spring connection 5. The upper end 6 of the brake shoe 4 rests on the wheel brake cylinder 2. The lower end 7 of the brake shoe 4 introduces the brake pressure supplied by the piston 8 of the wheel brake cylinder 3 into the brake shoe 4.

Two return springs 9, 10 pull the brake shoe 4 clear of the brake drum 11 upon pressure relief.

A stop 12 is provided in the sheet metal web 13 of the brake shoe 4 to cooperate with a per se known adjusting means.

The adjusting means consists of an adjusting lever 15 supported for rotation about a clamping sleeve 14 on the sheet metal web 13 of the brake shoe 4, a return spring 16, a pressure rod 17 which is bifurcated at one end, a pinion 18, and a pressure sleeve 19. The pressure sleeve 19 is supported towards the right on a stop 20 which is stationary with respect to the backplate 1. This stop 20 may be part of the wheel brake cylinder 3. The pressure sleeve 19 is free to move to the left, out of the stop 20.

Upon braking in forward travelling direction, as indicated by arrow 21, the brake shoe 4 is effective trailingly, i.e. its factor is low. With the backward travelling direction the brake shoe 4 is effective leadingly and accordingly its factor is high.

A second brake shoe 22 and a third brake shoe 23 are shown at the right in the drawing. As can be seen, the first brake shoe 4, and the second and third brake shoes 22, 23 are disposed opposite each other at either side of an axis of symmetry 42. Further the first brake shoe 4 has an effective frictional surface with the drum at least approximately as great as the effective frictional surfaces of the second and third brake shoes 22, 23 together. It can also be seen that the frictional surfaces of the three brake shoes 4, 22, 23 are arranged not to overlap in a circumferential direction, with the frictional surface of the third brake shoe 23 being smaller than that of the second brake shoe 22.

The second brake shoe 22 is pressed in per se known manner against the backplate 1 by a pin/spring connection 24. The pin passes through a recess formed in a sheet metal web 29, located underneath, of the third brake shoe 23.

Adjustment of the second brake shoe 22 may be effected by an adjusting means of the kind mentioned above. As shown in the drawing, however, simple frictional adjustment is provided, comprising a plate 25 which is rotatable in frictional engagement with the backplate 1 and formed with a recess 26 by which it surrounds with clearance a clamping sleeve 27 pressed into the sheet metal web 30 of the brake shoe 22. As the movement of the brake shoe 22 exceeds the clearance, the plate 25 is taken along and adjusted.

Upon hydraulic pressurization of the brake, brake pressure is introduced into the second brake shoe 22 by the piston 28 disposed in the wheel brake cylinder 2. In the forward travelling direction, marked by arrow 21, also the second brake shoe 22 becomes effective trailingly and has a correspondingly low characteristic value. Upon braking in the backward travelling direction, on the other hand, the second brake shoe 22 is supported leadingly so that its characteristic value is high.

The sheet metal web 29 of the third brake shoe 23 mainly lies between the sheet metal web 30 of the second brake shoe 22 and the backplate 1. The sheet metal web 29 is rotatably supported by a pin 31 which is riveted to the backplate 1.

At the lower end section, as seen in the drawing, of the third brake shoe 23 a hand brake lever 32 is fixed by a rivet connection 33 for rotation on the sheet metal web 29. In its upper end section the hand brake lever 32 has a bent portion 34 formed to receive a brake cable. Near the rivet connection 33 the hand brake lever 32 is formed with a recess 35 which is engaged by a bifurcated end 36 of a pressure rod 37. The pressure rod 37 is supported in a pressure sleeve 39 by way of a pinion 38 acting as stop.

Upon mechanical braking, i.e. actuation of the manually operable brake, the first brake shoe 4 as well as the third brake shoe 23 are moved into frictional engagement with the brake drum 11. In both directions of travelling the hand brake thus acts as a simplex brake: in the forward travelling direction the first brake shoe 4 acts trailingly and the third brake shoe 23 acts leadingly; in the backward travelling direction, on the other hand, the first brake shoe 4 acts leadingly while the third brake shoe 23 acts trailingly.

The third brake shoe 23 is adjusted manually by way of the pinion 38. As the wear of the third brake shoe 23 may be assumed to be low, an automatic adjusting device is not necessary.

The second brake shoe 22 is withdrawn from the brake drum 11 upon relief of the hydraulic pressure by means of the return spring 10 and another return spring 40. Upon relief of the third brake shoe 23, a return spring 41 pulls the same clear of the brake drum 11. Return spring 40 connects the second brake shoe 23 with the stop. Return spring 41 connects the third brake shoe 22 with the pressure sleeve 39.

As the hand brake is designed as a simplex brake, its characteristic value is distinctly higher than that obtained upon hydraulic braking in the forward travelling direction.

It follows from the above that the drum brake has a relatively stable characteristic value, i.e. is of low sensitivity when pressurized hydraulically in the forward travelling direction. The hand brake, on the other hand, acts as a simplex brake in both travelling directions and consequently has a higher characteristic value in both cases.

What is claimed is:

1. A drum brake for a vehicle wheel comprising first, second and third brake shoes, means for hydraulically actuating two of said brake shoes but not said third shoe, and means for mechanically actuating one of said first two shoes and said third shoe, but not the other of said first two shoes, means for supporting said first two shoes so that upon hydraulic actuation both are trailing shoes when said wheel is travelling in a forward direction, and means for supporting said one of said first two shoes and said third shoe so that upon mechanical actuation in the forward direction of wheel travel one of the last mentioned shoes is a trailing shoe and the other a leading shoe, and vice versa in the backward travel of said wheel.

2. The drum brake as claimed in claim 1 wherein the first brake shoe (4) has an effective frictional surface with the drum (11) at least approximately as great as the effective frictional surfaces of the second and third brakes shoes (22,23) together.

3. The drum brake as claimed in claim 2, wherein the frictional surfaces of the three brake shoes (4,22,23) are arranged not to overlap in circumferential direction, with the frictional surface of the third brake shoe (23) being smaller than that of the second brake shoe (22).

4. The drum brake as claimed in any one of the preceding claims, wherein the first brake shoe (4), on the one hand, and the second and third brake shoes (22,23), on the other hand, are disposed opposite each other at either side of an axis of symmetry (42).

* * * * *